June 5, 1934.  E. S. PORTER  1,962,031
MOTION PICTURE CAMERA
Filed June 30, 1930  7 Sheets-Sheet 2

INVENTOR
Edwin S. Porter
BY
Austin & Dix
ATTORNEYS

June 5, 1934.  E. S. PORTER  1,962,031

MOTION PICTURE CAMERA

Filed June 30, 1930  7 Sheets-Sheet 4

INVENTOR
Edwin S. Porter
BY
Austin & Dix
ATTORNEYS

June 5, 1934.　　　　E. S. PORTER　　　　1,962,031
MOTION PICTURE CAMERA
Filed June 30, 1930　　　7 Sheets-Sheet 6

INVENTOR
Edwin S. Porter
BY
Austin & Dix
ATTORNEYS

Patented June 5, 1934

1,962,031

UNITED STATES PATENT OFFICE 1,962,031

MOTION PICTURE CAMERA

Edwin Stanton Porter, New York, N. Y., assignor, by mesne assignments, to Edwin S. Porter, New York, N. Y.

Application June 30, 1930, Serial No. 464,739

9 Claims. (Cl. 88—17)

The present invention relates to motion picture cameras and more particularly to amateur motion picture cameras.

It is an object of the invention to provide a motion picture camera of the magazine type, which is so constructed that a magazine loaded with film and ready for use can be easily inserted into the camera even by an amateur.

It is a further object of the invention to provide a motion picture camera which has a compact construction, which is light in weight and which is simple to use.

It is a further object of the invention to provide a camera which is of such a size that it can be slipped into the pocket of the user.

It is another object of the invention to provide a camera provided with a film magazine which is adapted to maintain a loop between the film supply spool and the intermittent feeding mechanism and a loop between the feeding mechanism and the take-up spool and which has a mechanism associated with said loops in such a manner that every time the intermittent feeding mechanism functions, the portion of film drawn passed the picture window is taken up and when the latter portion of film is taken up, a fresh portion of film is unrolled from the supply spool preparatory to the next operation of the intermittent feeding mechanism.

It is also within the contemplation of the invention to provide a spring driving mechanism, which is constructed in such a manner as to give relatively constant feeding forces or speeds throughout substantially the entire length of the film, and which involves the use of a plurality of coil springs in series.

Another object of the invention is to provide a motion picture camera with a duplex sighting device which is capable of use in conjunction in the taking of pictures at a close range and also at a distant range.

Still a further object of the invention is to provide a motion picture camera with a counting device which indicates the number of feet of film used, which has a simple and reliable construction and which is so positioned that it is in alinement with the sighting device.

Other objects of the invention will become clear from the following description taken in conjunction with the accompanying drawings, which.

Figures 1, 2:
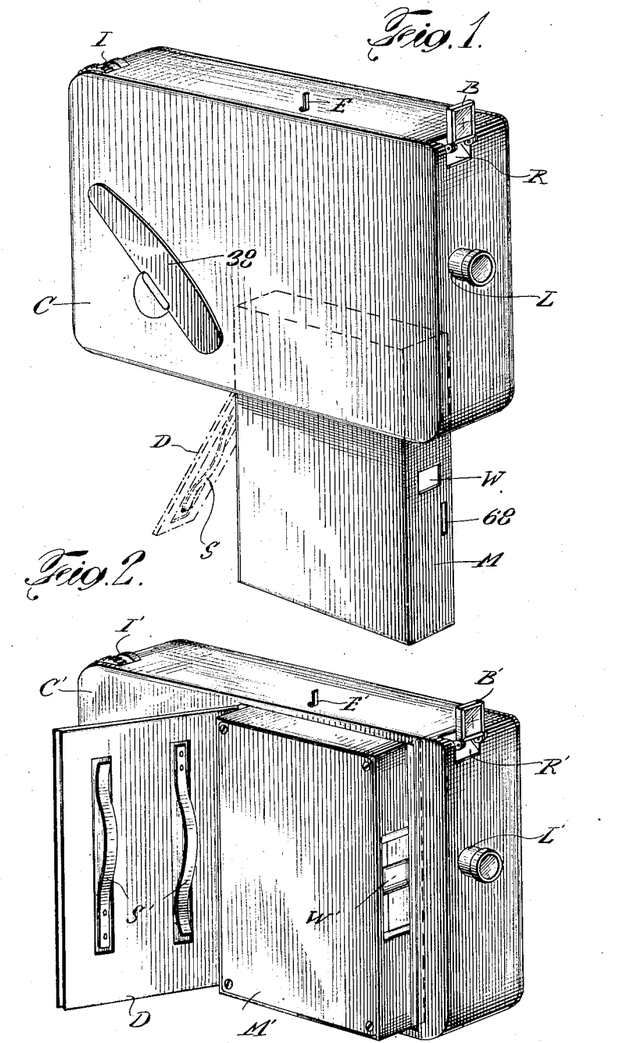
Fig. 1 is a perspective view of the camera embodying my invention showing the film magazine partly withdrawn from the camera.
Fig. 2 is a modified embodiment of my invention showing a cover on the one side of the camera in an open position with the film magazine in a partly withdrawn position.

Referring more particularly to Fig. 1 the reference character C designates the new motion picture camera which is so constructed that an improved film magazine or cartridge M may be inserted therein as a unit when the trap door D is in an open condition. When the trap door D is in a closed condition, a spring S and S" holds the film magazine in its proper position in the camera so that the picture window W is in proper alignment with a lens system L. When trap door D is opened ejector spring J ejects the film magazine slightly from the camera casing so that the magazine can be grasped and removed from the camera.

By providing a film magazine of unitary character which has the film loaded therein in a condition ready for use, the user of the motion picture camera is not troubled with threading the film throughout the various parts of the camera. This feature is of special importance when the camera and magazine are used by amateurs. After the pictures have been taken by the camera, the user only has to remove the magazine containing the exposed film and replace it with a new magazine containing fresh or unexposed film. The user may then send the cartridge with the exposed film to the photographic factory or branch office for development and reloading with fresh film. The film magazine is properly loaded and threaded at the factory and thus provides a film magazine which is capable of being handled and sold as a unit and used conveniently and easily by the users, especially amateurs.

A modified embodiment of the invention is shown in Fig. 2 wherein the trap door D' of the new camera C' is located on the side thereof instead of one of the edges. The film magazine, M' is inserted into the camera sidewise instead of edgewise as in Fig. 1. Spring S' holds the magazine in its proper position within the camera when the trap door D' is closed so that picture window W' is in alignment with a lens system L'.

After the film magazine is inserted in the camera, motion pictures may be taken.

A duplex sighting device B and B' is mounted at the upper front corner of the camera so that the user may easily and conveniently adjust the camera in proper position for taking the pictures. When the sighting device is in its upper position as illustrated in the drawings, it is in position for use in conjunction in the taking of distant pictures. A sighting lug E and E' are provided on each of the cameras shown on Figs. 1 and 2 for use in conjunction with sighting device B or B' when the latter is used for distant pictures. For the taking of close pictures, sighting device B or B' is adjusted in its lower position so that the user of the camera may look into mirror R or R' and see the picture which is about to be taken. It is apparent that the duplex sighting device is very convenient and facilitates the taking of either distant or close pictures.

On the upper corner of the rear of the camera, a counting device I or I' indicates the number of feet in the film which have been used in taking pictures. By locating the counting device at the upper corner and in substantial alignment with sighting device B or B', a user may readily observe the number of feet of film which has been exposed in taking the pictures without looking away from the picture which is being taken. In this manner, the taking of pictures is greatly facilitated and the counting device is so arranged as not to interfere with the handling of the camera by the user.

Figure 3:
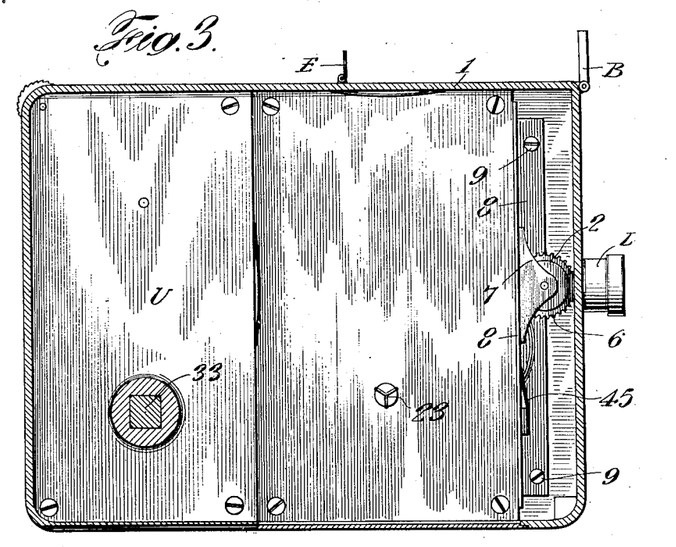
Fig. 3 is a sectional view taken on the line 3—3 of Fig. 10.
Figure 12:
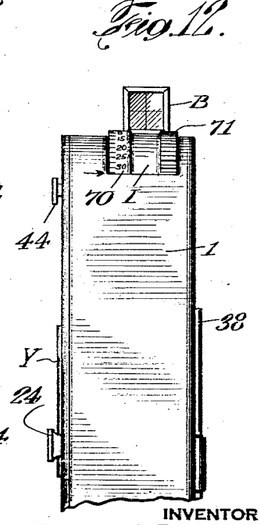
Fig. 12 is a rear elevational view, partly fragmentary of the camera shown in Fig. 1.
Figures 13, 14, 15, 16, 17, 18, 19:
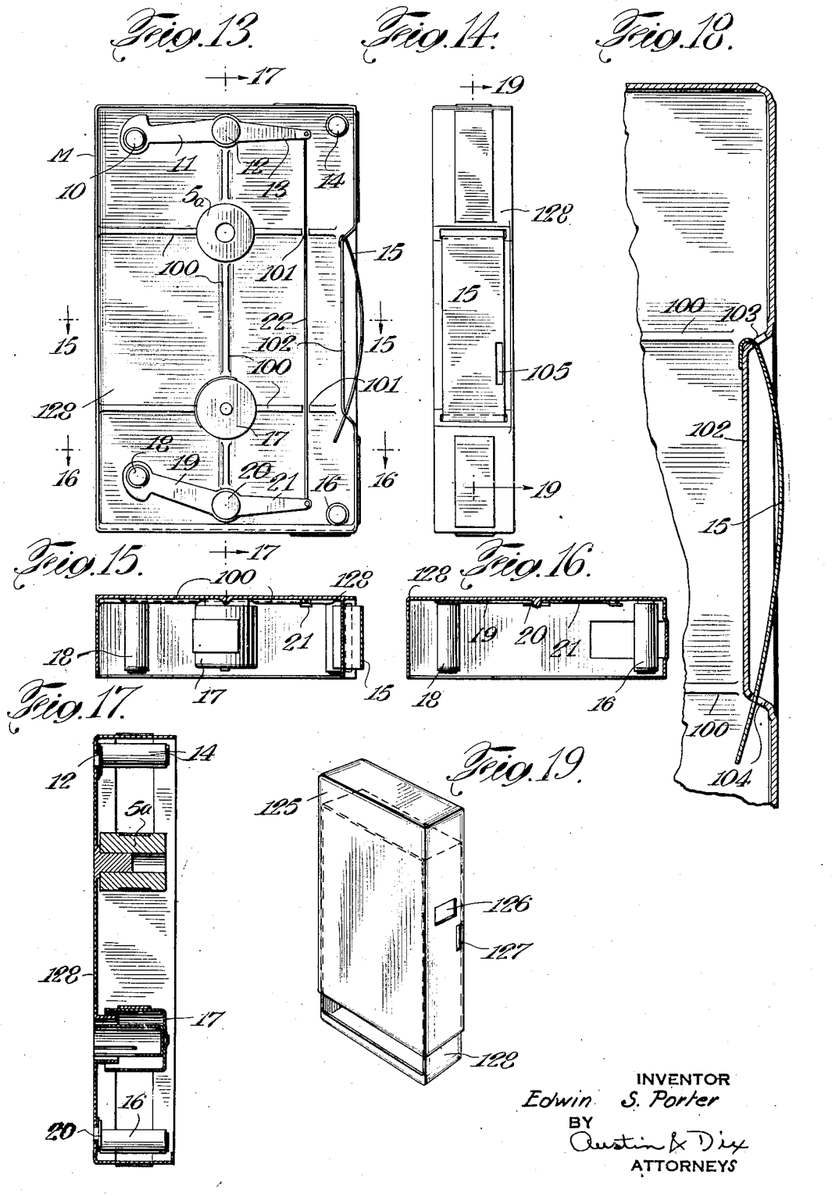
Fig. 13 is an elevational view of the film magazine with the cover removed to show the interior construction thereof.
Fig. 14 is a front elevation of the magazine shown in Fig. 13.
Figs. 15, 16, and 17 are sectional views taken on the lines 15—15, 16—16 and 17—17 of Fig. 13.
Fig. 18 is an enlarged view partly fragmentary taken on the line 18—18 of Fig. 14.
Fig. 19 is a perspective view of a modified embodiment of the film magazine.
Figure 20:
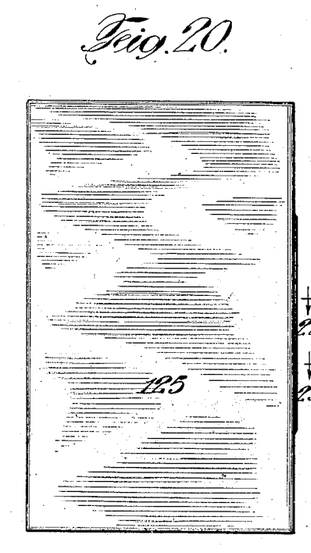
Fig. 20 is a side elevation of the magazine shown in Fig. 19.
Figures 21, 22, 23:
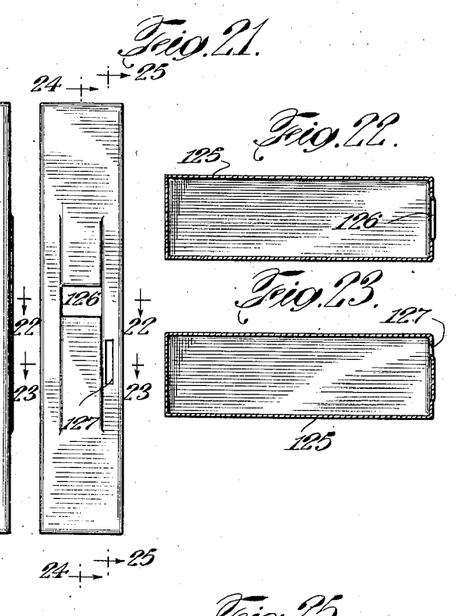
Fig. 21 is a front elevation of Fig. 20.
Figs. 22, 23, 24 and 25 are sectional views taken on the line 22—22, 23—23, 24—24 and 25—25 respectively of Fig. 21.
Figure 24:
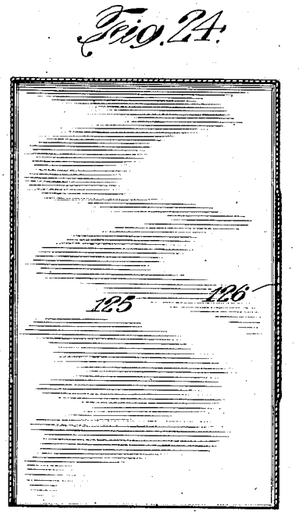
Figure 25:
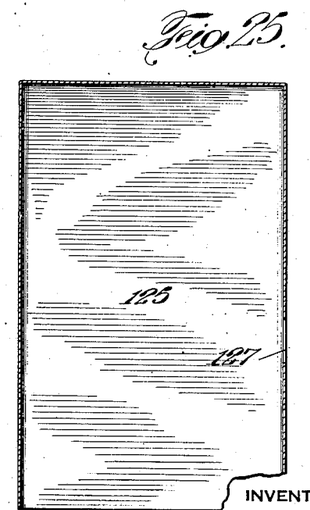
Figures 26, 27, 28:
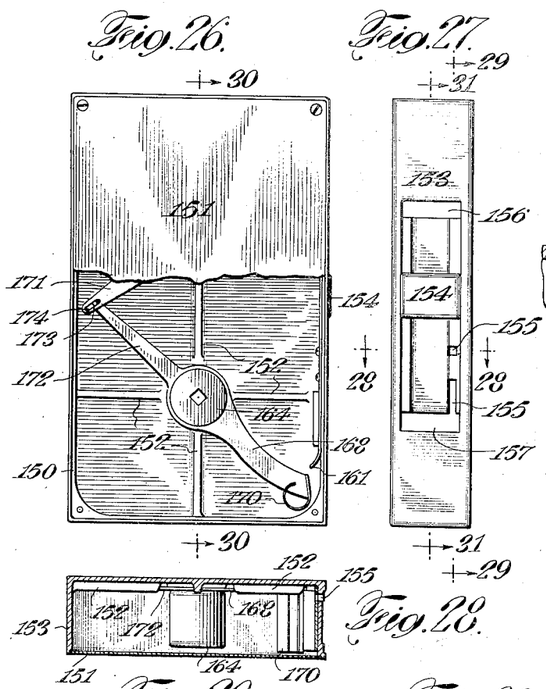
Fig. 26 is a side elevation, partly fragmentary of another embodiment of the film magazine.
Fig. 27 is a front elevation of the magazine shown in Fig. 26.
Figs. 28 and 29 are sectional views taken on the lines 28—28 and 29—29 respectively of Fig. 27.
Figures 29, 30:
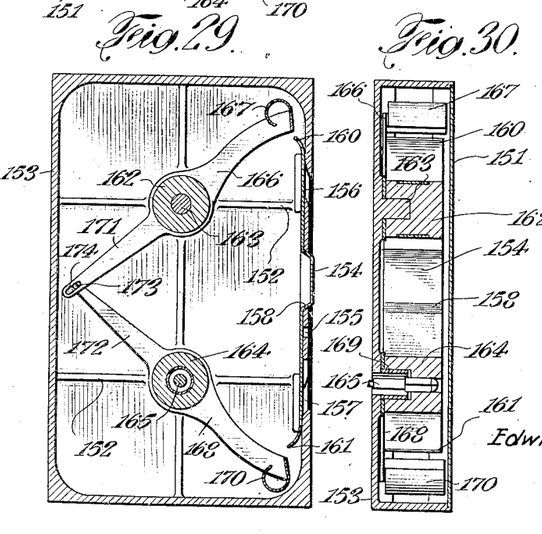
Fig. 30 is a sectional view taken on the line 30—30 of Fig. 26.
Figure 31:
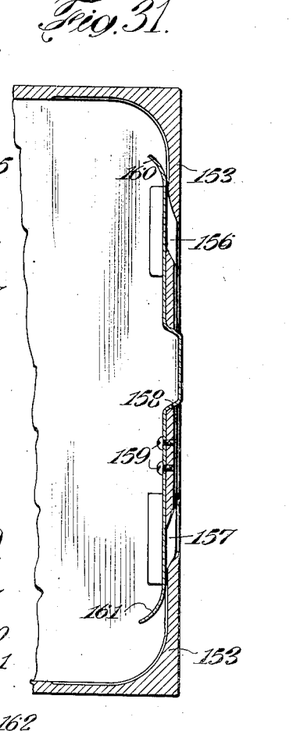
Fig. 31 is a sectional view, partly fragmentary, taken on the line 31—31 of Fig. 27.

The detailed construction of the camera is clearly shown in Figs. 3, 2 and 12.

In these figures, the reference character 1 designates a hollow casing which houses all of the parts of the camera. This casing is relatively narrow and has preferably such dimensions as to make it convenient to be slipped into the pocket of the user. The film magazine M is located in the front part of casing 1 whereas the power unit U is preferably located in the rear of the casing in back of magazine M. Between window W in the front of the film magazine and lens system L, is a shutter device 2 which is rotatively mounted and provided with apertures 3 so as to be capable of taking a picture each 180 degrees. In other words, in each revolution of the shutter device, two pictures are taken upon the film 4 which is located within window W. In the present embodiment, apertures 3 are cut or otherwise made in a tube 5 which extends between end gears 6. These gears serve a twofold purpose of providing the ends of shutter device 2 and also provide driving means for the rotation thereof. The shutter device 2 may be arranged in any suitable manner within the casing 1 but it is herein shown as being held in a mounting 7 which is secured to an angle plate 8. The angle plate is depicted as being fastened to a wall of the casing 1 by means of a plurality of screws 9 although any other suitable means may be employed for securing it to the said wall.

Film 4 is wound upon a supply spool 5 which is rotatively mounted in the upper part of magazine M. From supply spool, film 4 passes over a suitable guide member or roller 10 at one end of a rocker arm 11. This arm is pivoted on pin 12 and has its other end 13 extending towards the front of the casing. After the film 4 has passed over guide roller 10, it next preferably extends to a fixed roller which is rotatively secured in the upper corner of magazine M. The film then extends in front of a spring plate 15, which is located in back of window W and which is so arranged that the film is held in its proper focal plane in window W. After passing in front of window W, film 4 then preferably passes around a fixed roller 16 which corresponds to fixed roller 14 and which is mounted on the lower corner of the film magazine. Between fixed roller 16 and take-up spool 17 the film extends around a guide roller or member 18 which is mounted on one end of a rocker arm 19 which corresponds to rocker arm 11. A pin 20 is employed for pivotally mounting the rocker arm. End 21 of rocker arm 19 extends to the front of magazine M and is joined to end 13 of rocker arm 11 by means of a suitable connecting link 22.

By operatively joining the corresponding ends of rocker arms 11 and 19, they are caused to work in unison and to effect corresponding movement of guide rollers 10 and 18, which are located adjacent to the ends of the rocker arms. The advantages of this construction will be pointed out more fully hereinafter.

Figure 5:
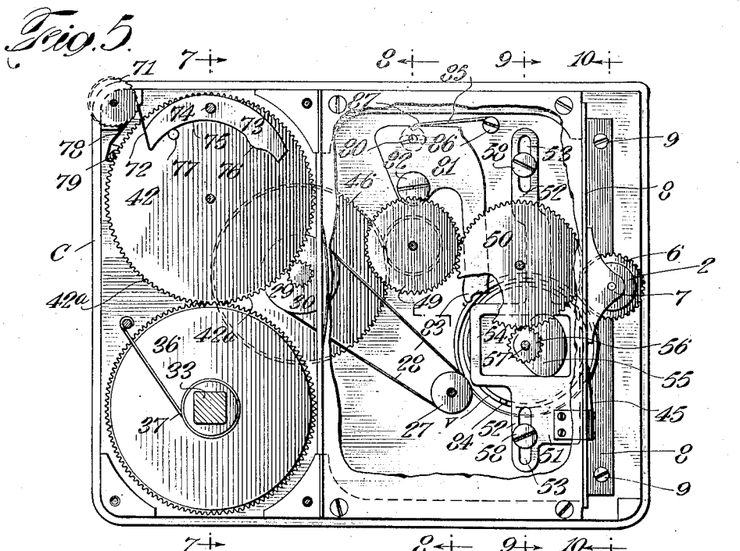
Fig. 5 is a side elevation, partly fragmentary and partly sectional of the camera illustrated in Fig. 1, showing the operating mechanism of the camera.
Figure 6:
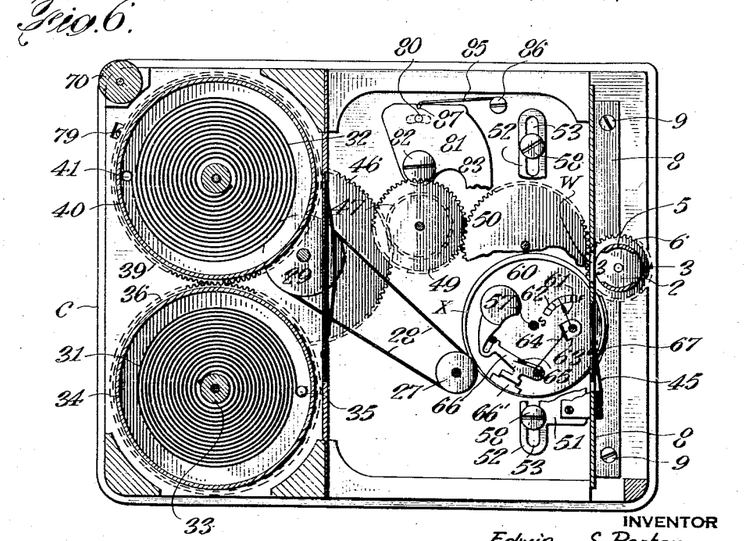
Fig. 6 is a sectional view, taken on the line 6—6 of Fig. 7.
Figures 7, 8:
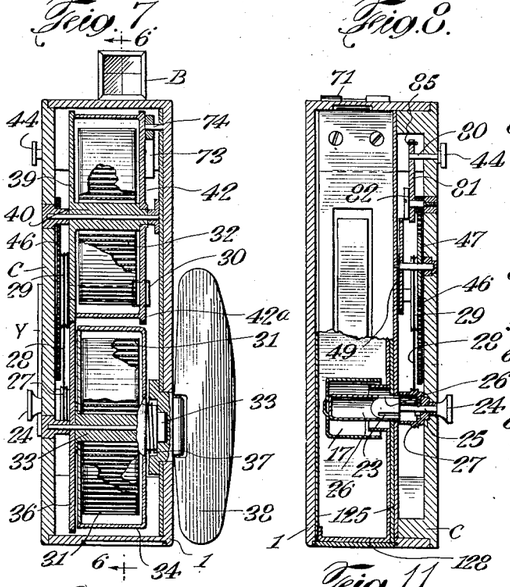
Figs. 7, 8, 9 and 10 are sectional views, taken on the lines 7—7, 8—8, 9—9 and 10—10 of Fig. 5.
Figure 9:
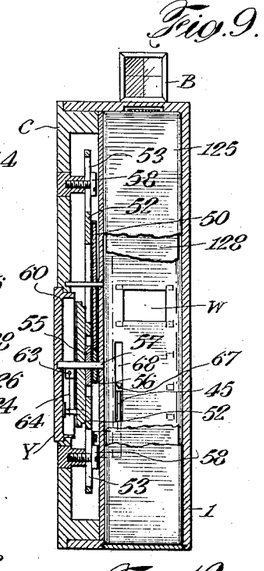
Figures 10, 11:
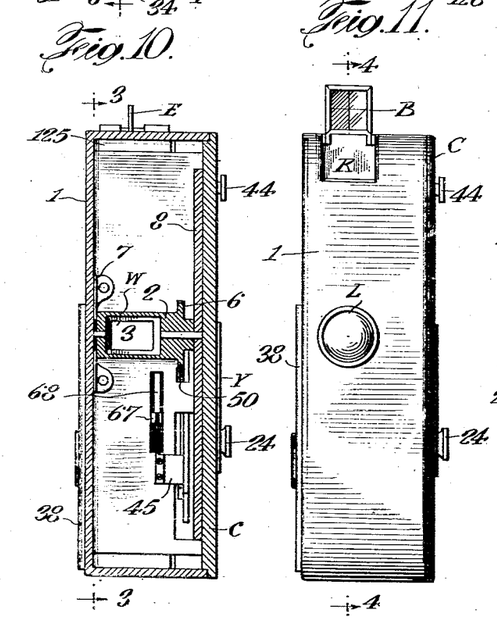
Fig. 11 is a front elevational view of the camera shown in Fig. 1.

Power is supplied to the take-up spool 17 by any suitable manner but there is herein provided a webbed keyway 23 in the form of a Y within the interior of take-up spool 17, as may be clearly seen in Figs. 3 and 8. A button 24 is located on the outside of the casing 1 and having a stub shaft 25 projecting through the casing 1 and provided on its inner free end with a lug 26 which fits into the keyway 23. By pushing the button inwardly so as to effect a union between lug 26 and keyway 23, driving pulley 27 is connected with the take-up spool 17. A flexible cord or belt or other suitable means 28 drives pulley 27 from a main driving pulley 29 (see Figs. 5, 6 and 8). Keyed or suitably secured to the shaft carrying pulley 29, is a gear or pinion 30 which is in mesh with gear 42a and which transmits the power from the power unit U to the driving pulley 29 for transmission to the take-up spool 17 by means of the mechanism described hereinbefore. When there is no film to be taken up by the take-up spool, cord 28 merely slides around on pulley 27 without rotating the latter or the take-up spool. If film is fed to the take-up spool then the latter is free to rotate and is driven by pulley 27 and cord 28.

The power unit U is preferably constituted of a plurality of coiled springs 31 and 32 which are herein depicted as two in number although any other appropriate number of springs in series may be employed. Spring 31 is preferably mounted upon a shaft 33 in a housing 34. The inner end of the spring is fixedly secured to shaft 33 and the outer end of the spring is fixedly secured to a pin 35. At one side of housing 34, a gear 36 is located which is secured to that part of the housing to which a pin 25 is fastened. At one end of shaft 33, a spring clutch 37 is provided by means of which spring 31, may be wound when handle 38 is turned. The spring clutch is of a well known construction and its operation is well known to those skilled in the art. When handle 38 is rotated or turned in one direction and spring 31 is wound beyond a certain extent, the latter spring transmits some of its power to spring 32 by means of gear 36 and mating gear 39, which is secured to shaft 40, carrying spring 32. As the outer end of spring 32 is secured to a pin 41, which is fastened to a cover or casing 42, provided with a gear 42a, spring 32 is wound up when gear 39 and shaft 40 rotates. In other words, as soon as spring 31 has a greater potential energy than spring 32, spring 31 unwinds and transmits sufficient energy to spring 32 as to bring about an equilibrium of the potential energy in spring 31 and 32 and to effect an equilibrium in the system. By continuing to rotate handle 38, not only will spring 31 become wound, but spring 32 will likewise become wound. After the power unit U is completely wound up, the handle 38 may be folded against the side of the camera as shown in Fig. 1.

A control button 44 may be used to release and to stop the power unit. The power unit not only drives the take-up spool 17 but also causes operation of the intermittent feeding mechanism 45, and the rotation of the shutter 2. In the present embodiment a certain mechanism is shown for transmitting the power to the shutter and to the intermittent feeding mechanism, but any other appropriate mechanism may be used. A gear 46 is rotatively secured to the shaft which carries pinion gear 30. Gear 46 meshes with gear 47 which is secured to a shaft carrying gear 49. From gear 49 the power is transmitted through gear 50 to gear 6, carried on shutter 2. By the aforesaid train of gears, rotatable shutter 2 is caused to rotate every time the mechanism is released and is put in motion.

The intermittent feeding mechanism 45 is carried on a shuttle 51 which reciprocates back and forth in a well known manner to cause the operation of the intermittent feeding mechanism 45 and the movement of film 4 within the film magazine. In the present instance, shuttle 51 is provided with closed extending ears 52 which are provided with elongated slots 53. The central portion of shuttle 51 is so configured as to form a hollow rectangular frame 54. Within frame 54 moves a cam 55 which has a well known shape and which is adapted to impart reciprocating motion to shuttle 51 when it is rotated by means of a gear 56, which is rigidly secured therewith by means of shaft 57 and which is in mesh with gear 50. Screws 58 or any suitable pin or element is provided in slots 53 so as to guide the shuttle 51 in its reciprocating movement. Gears 6 and 56 are so proportioned that shaft 57 and cam 55 make one complete revolution to every half revolution of rotatable shutter 2. In other words, for every complete rotation of shutter 2, shaft 57 and cam 55 have made two revolutions. This arrangement is adopted because rotatable shutter 2 is provided with two apertures 3 which in operation, causes the taking of one picture every 180 degrees of shutter 2 or two pictures for every complete rotation of shutter 2.

The shuttle and shutter operating mechanism, may be adjusted by a regulator 60 of the eccentric type, having a well known construction. Regulator 60 is carried on shaft 57 which also carries a governor and fly wheel. As may be seen from Fig. 6, an indicator hand 61 is provided in conjunction with an indicator scale 62. By moving the indicating arrow 61 towards the letter F on scale 62, the mechanism is made to go faster whereas by moving the indicating arrow toward the letter S on the scale, the mechanism is adjusted to move slow. When the indicating arrow is moved one way or the other, a lug 63 is turned with it. Lug 63 moves a bent spring 64, the free end of which abuts against a contact 65 on adjusting member 66. In this manner, the pressure between member 66 and shoe 66' is varied so as to increase or decrease the pressure between shoe 66' and eccentric friction ring X. The foregoing adjustment is made by the manufacturer for proper timing of the mechanism before the camera goes to the user.

For making adjustments after the camera leaves the manufacturer, a disc button Y, which is mounted on the outside of the camera casing and which is secured to eccentric friction ring X is provided for turning and adjusting the latter. By turning button Y, eccentric friction ring turns and makes either a greater or lesser frictional contact with regulator 60 which rotates with shaft 57. In this manner the frictional drag on ring X may be increased or decreased, and thus the speed of the operating mechanism may be decreased or increased.

The use and operation of the improved camera will be obvious to those skilled in the art. The film magazine is first inserted in position in the camera and then the trap door is closed. Handle 38 is then folded outwardly and then is turned to wind up the twin springs connected in series. After the springs are completely wound up, the camera is ready for use in taking motion pictures. If distant pictures are to be taken, then sighting device B is turned into an upper vertical position and sighting lug E is turned into a vertical position. If, however, the camera is to be used in taking close pictures, sighting lug E may be left in its folded position against the camera casing and sighting device B is turned into a lower vertical position. By looking into mirror R the operator is enabled to adjust the camera to take the desired pictures. When these adjustments have been made, control knob 44 is moved to release the operating mechanism and permit the intermittent feeding mechanism 45 to insert its tooth plunger 57 into an aperture 68 provided in the front of the magazine casing, below the picture window W. The intermittent feeding mechanism operates in a well known manner to move the film, picture by picture, passed the picture window W so as to take a series of pictures in succession.

It has been explained hereinabove that the shutter 2, which operates in synchronism with shuttle 51, operates the intermittent feeding mechanism so that window W is closed to light and to the lens system L while the intermittent feeding mechanism is drawing or moving a strip of film sufficiently large to take another picture. When this new piece of film has been moved into position, shutter 2 is in such a position that apertures 3 are in alignment with picture window 4 and the lens system L, thus permitting the taking of another picture. This operation continues until the desired number of pictures have been taken by the operator when he moves control knob 44 to stop the operating mechanism.

The operator of the camera may ascertain the number of feet of film used by observing a graduated dial 70 of the indicating device I. This device may be operated with any appropriate mechanism. In the present embodiment, a gear 71 is actuated by a striker 72 carried on a rocking member 73 which is pivoted on a pin 74.

Rocking member 73 is provided with a cam face 75 which is herein depicted as being located on the under side thereof. The cam has a raised element or bump 76 incorporated at one end thereof which is adapted to be struck by pin 77 projecting from the wall of casing 42. Every time spring casing 42 rotates, pin 77 actuates rocking member 73 and causes striker 72 to fall and then to engage one of the teeth of gear 71. As pin 77 moves in contact with cam face 75, it raises the left side of rocker arm 73 and striker 72 which rotates gear 71 through an arc corresponding to the size of the tooth. A projecting leaf spring 78 is fixed to the inner wall of the casing C by means of a screw 79 or the like. The free end of spring 78 rides upon the teeth of gear 71 and only permits gear 71 to rotate in one direction and one tooth at a time. It will thus be apparent that as the film in the magazine is unwound from the supply spool and is exposed for the taking of pictures, indicator device I indicates the number of feet of film so exposed with reference to dial 70.

The starting and stopping of the camera mechanism as explained hereinabove is controlled by means of control button 44. This button carries a pin 80 which is secured to shuttle engaging member 81 within the interior of the casing. Member 81 is capable of being turned about a pin 82 (see Fig. 5). One end of member 81 is provided with an arm 83 which is adapted to engage lug 84 on the fly wheel Y. When arm 83 is in the position shown in Fig. 5, it engages lug 84 and prevents the operation of the mechanism. A leaf spring 85, which projects therefrom, is secured to a screw 86 engaging a depression 87 on the upper end of shuttle engaging member 80 so as to hold the latter in a position which locks the shuttle and prevents the mechanism from operating. By moving button 44, member 81 can be turned through an arc in a clockwise direction so as to throw arm 83 clear of lug 84. After lug 84 has passed arm 83, spring 85 returns member 81 to a neutral position where arm 83 again engages lug 84. In this manner, a single picture can be taken. For taking motion pictures, control button 44 is moved so as to turn member 81 through an arc in a counter-clockwise direction. By thus moving member 81, arm 83 is freed from spring 85 and is thrown clear of lug 84 which is free to rotate with fly-wheel Y. When it is desired to stop the mechanism, control button 44 is moved to a neutral or central position so that arm 83 engages lug 84. Instead of the control device herein shown and described, any other appropriate device may be employed.

Figure 4:
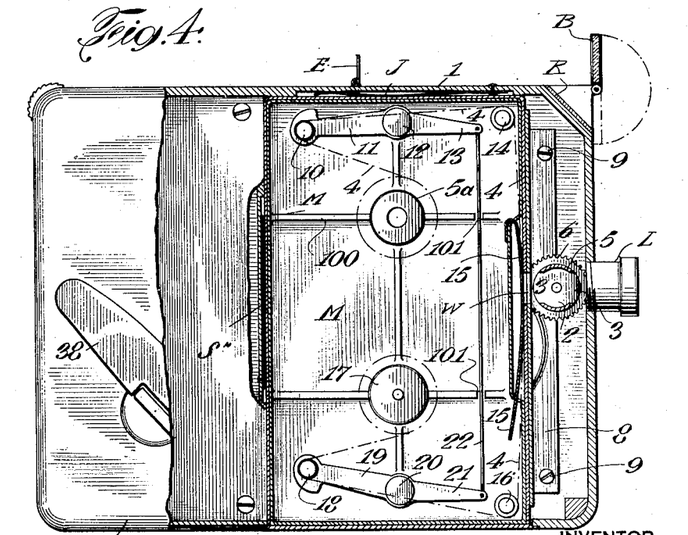
Fig. 4 is taken on line 4—4 of Fig. 11.

The magazine which is depicted in Fig. 4 is shown in detail in Figs. 13 to 18. Any suitable material may be used for the construction of the magazine but I prefer to die cast the casing of bakelite or an alloy or some other suitable material. In practice, I prefer to incorporate reinforcing web 100 within the bottom of the casing and slots 101 are provided for the passage of cross link 22.

The spring plate 15 for guiding the film in front of the window may be arranged in any suitable manner. In the present instance, it is shown as being secured at its upper end to a front wall 102. This wall is provided at its upper end with an inlet aperture 103 for the film and an outlet aperture 104. The lower end of spring plate 15 projects through outlet aperture 104 as a free element. In this manner, spring plate 15 presses the film tightly against the inner face of window W. The spring plate is also provided with a slot 105 through which the intermittent feeding mechanism may project in order to move the film through the magazine.

In Figs. 19 to 25, a modified film magazine is illustrated. The magazine consists of two parts, an outer casing 125 carrying a picture window 126 and a slot 127 for the intermittent feeding mechanism and an inner casing 128 which slides within the outer casing. The outer casing may be made in any appropriate manner but I prefer to use a metallic or bakelite construction. The details of fabricating these magazines are well known to those skilled in the art and need not be described here in detail.

Another modified embodiment of my film magazine is shown in Figs. 26 to 31. The magazine comprises an outer casing 150 and a cover 151. The casing 150 is provided with reinforcing ribs 152 to give strength to the casing as explained hereinabove. The front wall 153 of the casing is provided with a picture window 54 and apertures 155 for the intermittent film feeding mechanism. Above picture window 154 is an aperture 156 through which the film is fed past the picture window. Below the picture window is an aperture 157 through which the film re-enters the film magazine. In order to hold the film in its proper position as it passes the picture window, a bent spring 158 is secured to the inner face of the front wall 153 by means of screws 159. The upper end 160 and the lower end 161 of springs 158 is so contoured as to act as closures for apertures 156 and 157 and to guide the film as it leaves and enters the magazine.

Within the magazine is provided a supply spool 162 which is mounted upon a pin 163. In the lower part of the casing, take-up spool 164 is mounted upon a driving member 165. The supply spools and take-up spools operate as described hereinbefore.

Upon pin 163, a rocker arm 166 is mounted. On the front end of the rocker arm, a guide member 167 is provided. This member is made a part of the metal of rocker arm 166. A corresponding rocker arm 168 is mounted on a collar 169 which surrounds the driving member 165. The front end of this rocker arm is provided with a guide member 70 which is also formed as an integral part thereof. The rear ends 171 and 172 of rocker arms 166 and 188 respectively are joined together by means of a pin 173 engaging a slot 174. In the present instance the pin is carried on the rear end of 172 of rocker arm 178 and slot 174 is incorporated in the rear end of 171 or rocker arm 166. Of course the respective position of the pin and slot can be changed or replaced by other appropriate connecting means. By connecting rocker arm 166 and 168 together in the aforesaid manner, the two arms are capable of operating in unison in the same manner as described hereinbefore. In other words, every time the film is moved by the intermittent feeding mechanism, rocker arm 166 is pulled downwardly and this in turn causes the front end of rocker arm 168 to move downwardly by means of the pin and slot connection at the rear ends of the rocker arms. When driving shaft 165 causes take-up spool 164 to take up the film which has been fed past the picture window, the front end of rocker arm 168 is moved upwardly. The upward movement of this sort causes the front of rocker arm 168 to move upwardly due to the fact that pin 173 moves in slot 174 and pulls the rear end of rocker arm 166 downwardly.

By operatively connecting the two rocker arms in this manner, and by arranging them to work in unison, it is possible to unwind a portion of fresh unexposed film from the supply spool 162, thus relieving the intermittent feeding mechanism of the burden of withdrawing such film from the supply spool. In the same way, the position of the film which is in alignment with the picture window is not disturbed by the take-up spool 164 which winds up the exposed portion of film.

It will be noted that any form of the film magazine may be used in conjunction with the camera illustrated and described herein.

Although certain embodiments of the invention have been herein described and illustrated, it is to be observed that modifications may be resorted to without departing from the spirit and scope of the invention as defined in the appended claims.

What is claimed is:

1. In a motion picture camera of relatively narrow width, in combination, a casing closed on all sides and provided with a door, a lens mounted in one wall of said casing, a shutter mounted back of said lens and in line therewith, said casing being divided into a series of compartments, one compartment adapted to receive a unit magazine carrying film to be exposed, said magazine having an opening past which the film is moved, said opening registering with said shutter and said lens, a spring power unit mounted in a second compartment which extends the full width between the side walls of said casing, a third compartment beside said first compartment and with said first compartment occupying the full width between the side walls of said casing, a power transmitting mechanism mounted in said third compartment and adapted to be driven from said power unit, and an intermittent mechanism including a claw mounted in said third compartment and extending to the front of the casing for intermittently engaging the film in said magazine to move the same in front of the aperture therein, said intermittent mechanism being driven by said power unit, a pulley means adapted to be engaged with and drive a shaft element extending outside of said magazine for the purpose of winding up the film in said magazine that has been exposed, said pulley means being connected to said power transmitting mechanism when said magazine has been assembled in said camera, said shutter being driven by said power transmitting mechanism, and means for controlling the operation of said power transmitting mechanism.

2. In a motion picture camera of relatively narrow width, in combination, a casing closed on all sides and provided with a door, a lens mounted in one wall of said casing, a shutter mounted back of said lens and in line therewith, said casing being divided into a series of compartments, one compartment adapted to receive a unit magazine carrying film to be exposed, said magazine having an opening past which the film is moved, said opening registering with said shutter and said lens, a spring power unit mounted in a second compartment which extends the full width between the side walls of said casing, a third compartment beside said first compartment and with said first compartment occupying the full width between the side walls of said casing, a power transmitting mechanism mounted in said third compartment and adapted to be driven from said power unit, and an intermittent mechanism including a claw mounted in said third compartment and extending to the front of the casing for intermittently engaging the film in said magazine to move the same in front of the opening therein, said intermittent mechanism being driven by said power unit, a pulley means adapted to be engaged with and drive a shaft element extending outside of said magazine for the purpose of winding up the film in said magazine that has been exposed, said pulley means being connected to said power transmitting mechanism when said magazine has been assembled in said camera, said shutter being driven by said power transmitting mechanism, and means for controlling the operation of said power transmitting mechanism, a film supply spool and a take-up spool within said magazine, and means operatively associated with said spools and arranged to operate in unison whereby unexposed portions of the film are moved from said supply spool, every time the take-up spool winds up portions of the exposed film.

3. In a motion picture camera of relatively narrow width, in combination, a casing closed on all sides and provided with a door, a lens mounted in one wall of said casing, a shutter mounted back of said lens and in line therewith, said casing being divided into a series of compartments, one compartment adapted to receive a unit magazine carrying film to be exposed, said magazine having an opening past which the film is moved, said opening registering with said shutter and said lens, a spring power unit mounted in a second compartment which extends the full width between the side walls of said casing, a third compartment beside said first compartment and with said first compartment occupying the full width between the side walls of said casing, a power transmitting mechanism mounted in said third compartment and adapted to be driven from said power unit, and an intermittent mechanism including a claw mounted in said third compartment and extending to the front of the casing for intermittently engaging the film in said magazine to move the same in front of the opening therein, said intermittent mechanism being driven by said power unit, a pulley means adapted to be engaged with and drive a shaft element extending outside of said magazine for the purpose of winding up a film in said magazine that has been exposed, said pulley means being connected to said power transmitting mechanism when said magazine has been assembled in said camera, said shutter being driven from said power transmitting mechanism, means for controlling the operation of said power transmitting mechanism, a film supply spool and a take-up spool within said magazine, means operatively associated with said spools and arranged to operate in unison whereby unexposed portions of the film are moved from said supply spool every time the take-up spool winds up portions of the exposed film, and an indicator device for indicating the number of feet of film taken up by said take-up spool, and means operatively associated with said spring power unit for actuating said indicator device.

4. In a motion picture camera of relatively narrow width, in combination, a casing closed on all sides and provided with a door, a lens mounted in one wall of said casing, a shutter mounted back of said lens and in line therewith, said casing being divided into a series of compartments, one compartment adapted to receive a unit magazine carrying film to be exposed, said magazine having an opening past which the film is moved, said opening registering with said shutter and said lens, a spring power unit mounted in a second compartment which extends the full width between the side walls of said casing, a third compartment beside said first compartment and with said first compartment occupying the full width between the side walls of said casing, a power transmitting mechanism mounted in said third compartment and adapted to be driven from said power unit, and an intermittent mechanism including a claw mounted in said third compartment and extending to the front of the casing for intermittently engaging the film in said magazine to move the same in front of the opening therein, said intermittent mechanism being driven by said power unit, a pulley means adapted to be engaged with and drive a shaft element extending out side of said magazine for the purpose of winding up the film in said magazine that has been exposed, said pulley means being connected to said power transmitting mechanism when said magazine has been assembled in said camera, said shutter being driven by said power transmitting mechanism, and means for controlling the operation of said power transmitting mechanism, said control means for releasing and stopping the spring power device including an arm adapted to engage the claw driving mechanism when the mechanism is to be stopped and adapted to be released therefrom when the mechanism is to be released to start the taking of pictures.

5. In a motion picture camera of relatively narrow width, in combination, a casing closed on all sides and provided with a door, a lens mounted in one wall of said casing, a shutter mounted back of said lens and in line therewith, said casing being divided into a series of compartments, one compartment adapted to receive a unit magazine carrying film to be exposed, said magazine having an opening past which the film is moved, said opening registering with said shutter and said lens, a spring power unit mounted in a second compartment which extends the full width between the said walls of said casing, a third compartment beside said first compartment and with said first compartment occupying the full width between the side walls of said casing, a power transmitting mechanism mounted in said third compartment and adapted to be driven from said power unit, and an intermittent mechanism including a claw mounted in said third compartment and extending to the front of the casing for intermittently engaging the film in said magazine to move the same in front of the aperture therein, said intermittent mechanism being driven by said power unit, a pulley means adapted to be engaged with and drive a shaft element extending out side of the magazine for the purpose of winding up the film in said magazine that has been exposed, said pulley means being connected to said power transmitting mechanism when said magazine has been assembled in said camera, said shutter being driven by said power transmitting mechanism, means for controlling the operation of said power transmitting mechanism, control means for releasing and stopping the spring power device including an arm adapted to engage the claw driving mechanism when the mechanism is to be stopped and adapted to be released therefrom when the mechanism is to be released to start the taking of pictures, and an indicator device for indicating the number of feet of film taken up by said take-up spool and means operatively associated with said spring power unit for actuating said indicator device.

6. In a motion picture camera of relatively narrow width, in combination, a casing closed on all sides and provided with a door, a lens mounted in one wall of said casing, a shutter mounted back of said lens and in line therewith, said casing being divided into a series of compartments, one compartment adapted to receive a unit magazine carrying film to be exposed, said magazine having an opening past which the film is moved, said opening registering with said shutter and said lens, a spring power unit mounted in a second compartment which extends the full width between the side walls of said casing, a third compartment beside said first compartment and with said first compartment occupying the full width between the side walls of said casing, a power transmitting mechanism mounted in said third compartment and adapted to be driven from said power unit, an intermittent mechanism including a claw mounted in said third compartment and extending to the front of the casing for intermittently engaging the film in said magazine to move the same in front of the aperture therein, said intermittent mechanism being driven by said power unit, a pulley means adapted to be engaged with and drive a shaft element extending outside of said magazine for the purpose of winding up the film in said magazine that has been exposed, said pulley means being connected to said power transmitting mechanism when said magazine has been assembled in said camera, said shutter being driven by said power transmitting mechanism, means for controlling the operation of said power transmitting mechanism, a film supply spool and a take-up spool in said magazine, means operatively associated with said spools and arranged to operate in unison whereby unexposed portions of the film are moved from said supply spool every time the take-up spool winds up portions of exposed film, an indicator device for indicating the number of feet of film taken up by said take-up spool, means operatively associated with said spring power unit for actuating said indicator device, said control means for releasing and stopping the spring power device including an arm adapted to engage the claw driving mechanism when the mechanism is to be stopped and adapted to be released therefrom when the mechanism is to be released for the taking of pictures.

7. In a motion picture camera, in combination, a casing, a lens mounted in one wall thereof, a shutter mounted to the rear of said lens and in line therewith, a spring motor, a train of gears connected between the motor and said shutter for driving said shutter, said motor extending across the width of said casing, said gear train extending only partly across said casing, a closed film magazine adapted to be inserted in said casing between said gear train and the other wall of said casing, an intermittent film feeding mechanism included in said gear train and adapted to move the film in said magazine past an aperture formed in said magazine and positioned in line with said shutter and said lens, one portion of said gear train adapted to extend to engage with a member extending outside of said magazine, said magazine having a spool with a supply of film wound thereon, a take-up spool mounted on the shaft extending out of said magazine, the film being threaded from the supply spool past the opening in said magazine to said take-up spool, and a plurality of co-operatively connected means associated respectively with said supply spool and take-up spool for withdrawing portions of the unexposed film from the supply spool every time the film is moved by said intermittent mechanism past said opening in said magazine.

8. In a motion picture camera, in combination, a casing, a lens mounted in one wall thereof, a shutter mounted to the rear of said lens and in line therewith, a spring motor, a train of gears connected between the motor and said shutter for driving said shutter, said motor extending across the width of said casing, said gear train extending only partly across said casing, a closed film magazine adapted to be inserted in said casing between said gear train and the other wall of said casing, an intermittent film feeding mechanism included in said gear train and adapted to move the film in said magazine past an aperture formed in said magazine and positioned in line with said shutter and said lens, one portion of said gear train adapted to extend to engage with a member extending outside of said magazine, said magazine having a spool with a supply of film wound thereon, a take-up spool mounted on the shaft extending out of said magazine, the film being threaded from the supply spool past the opening in said magazine to said take-up spool, and a plurality of co-operatively connected means associated respectively with said supply spool and said take-up spool for withdrawing portions of the unexposed film from the supply spool every time the film is moved by said intermittent mechanism past said opening in said magazine, and resilient means adjacent the aperture in the magazine to press against the film and hold it in position.

9. In a motion picture camera, in combination, a casing, a lens mounted in one wall thereof, a shutter mounted to the rear of said lens and in line therewith, a spring motor, a train of gears connected between the motor and said shutter for driving said shutter, said motor extending across the width of said casing, said gear train extending only partly across said casing, a closed film magazine adapted to be inserted in said casing between said gear train and the other wall of said casing, an intermittent film feeding mechanism included in said gear train and adapted to move the film in said magazine past an aperture formed in said magazine and positioned in line with said shutter and said lens, one portion of said gear train adapted to extend to engage with a member extending outside of said magazine, said magazine having a spool with a supply of film wound thereon, a take-up spool mounted on the shaft extending out of said magazine, the film being threaded from the supply spool past the opening in said magazine to said take-up spool, and a plurality of co-operatively connected means associated respectively with said supply spool and said take-up spool for withdrawing portions of the unexposed film from the supply spool every time the film is moved by said intermittent mechanism past said opening in said magazine, said co-operatively connected means consisting of a pair of rocker arms joined together in such manner as to operate in unison.

EDWIN STANTON PORTER.